United States Patent Office 3,325,186
Patented June 13, 1967

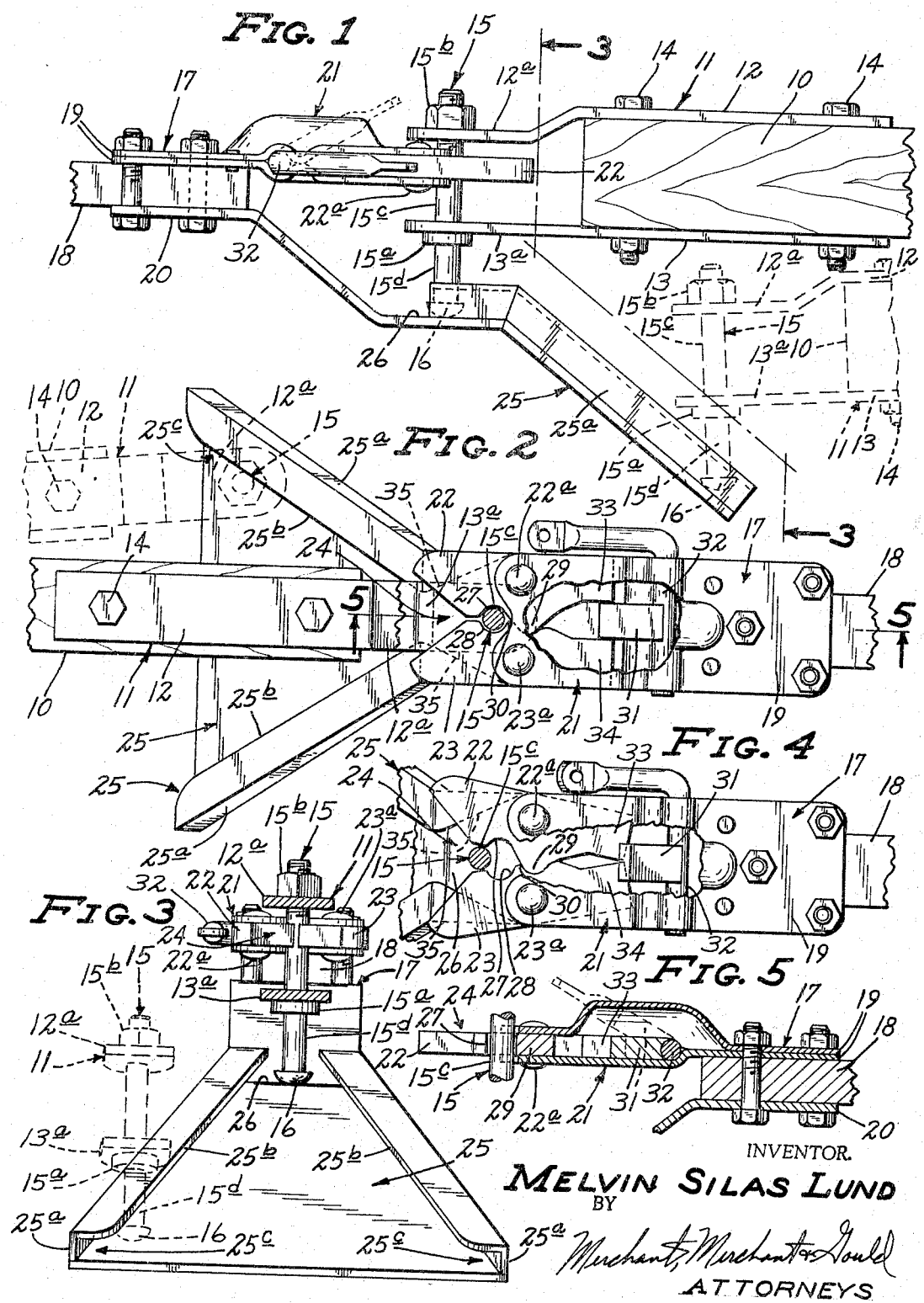

3,325,186
TRACTOR-TRAILER HITCHING MECHANISM
Melvin Silas Lund, Rte. 1, Madison, Minn. 56256
Filed Aug. 6, 1965, Ser. No. 477,816
2 Claims. (Cl. 280—477)

My invention relates to hitching devices, and more specifically to improvements to tractor-trailer hitching mechanisms.

The primary object of my invention is the provision of means, including a guide ramp, for automatically guiding the hitch pin associated with the trailing vehicle into locking engagement with the hitch of a towing vehicle, such as a farm tractor. To this end, I provide a novel hitch pin having an enlarged shoe on its lower end and which cooperates with a rearwardly diverging downwardly inclined guide ramp, the opposite side edges of which are formed to define channel forming lips which receive the enlarged shoe at least partially therein during guiding movements, whereby to prevent upward displacement of the hitch pin during guiding movements thereof toward locking engagement of same between the jaws of the hitch element.

A further object of my invention is the provision of a device of the class described wherein the lips associated with the opposite edges of the guide channel extend horizontally onto a pin-supporting platform, and which there converge rearwardly to guide and facilitate removal of the hitch pin from between the jaws during releasing movements there of.

A further object of my invention is the provision of a device of the class immediately above described which is rugged and durable in construction, and which is foolproof in its operation.

A further object of my invention is the provision of a device of the class above described which is relatively easy to install as original or replacement equipment on towed and/or towing vehicles.

The above and still further objects of my invention will become apparent from the following detailed specification, appended claims, and attached drawings.

Referring to the drawings wherein like characters indicate like parts throughout the several views:

FIG. 1 is a fragmentary view in side elevation of the drawbar and tongue of a tractor and trailing vehicle, showing my novel invention in place thereon;

FIG. 2 is a view in top plan of the structure shown in FIG. 1, portions thereof being broken away;

FIG. 3 is a view in vertical section as seen along the line 3—3 of FIG. 1;

FIG. 4 is a fragmentary view in top plan similar to FIG. 2, but showing a different position of the parts, portions thereof being broken away; and FIG. 5 is a view in longitudinal axial section taken on the line 5—5 of FIG. 2.

Referring with greater particularily to drawings, the numeral 10 indicates the tongue of a conventional farm wagon or the like to which bracket means, identified in its entirely by 11, is secured. As shown, the bracket means 11 includes a pair of generally parallel vertically spaced metallic straps 12, 13, secured, respectively, to the upper and lower surfaces of the tongue 10 by means of nut-equipped bolts and the like 14. At the forward ends, the straps 12, 13 project forwardly of the tongue 10 to define plate-like bracket elements 12a, 13a, through which a vertically disposed hitch pin 15 projects. Hitch pin 15 has a stop shoulder 15a intermediate its ends which engages the undersurface of the bracket element 13a and is threaded at its upper end to receive a nut 15b which in turn engages the upper surface of the plate-like bracket element 12a. In this manner, vertical movements of the hitch pin 15 with respect to the bracket 11 is prevented, while defining between the bracket elements 12a, 13a a hitch portion 15c. As shown, the hitch pin 15 depends from the shoulder 15a and defines a leg 15d which terminates at its extreme lower end in a diametrically enlarged shoe 16.

Adapted to cooperate with the structure above described is the second bracket means 17 adapted to be secured to the drawbar 18 of a farm tractor (not shown) or the like. The bracket means 17 likewise includes upper and lower clamping members 19, 20, the former of which secures a hitch element 21 in a rearwardly extended position. As shown, the hitch element 21 is conventional in form, and as shown, includes a pair of jaw members 22, 23 which are pivoted about spaced vertical axes 22a, 23a, respectively. At their rear ends, the jaws 22, 23 define a rearwardly diverging mouth 24 for the reception of the hitch portion 15c of the hitch pin 15 under conditions immediately hereinafter to be described.

The lower clamping plate 20 of bracket 17, as shown, projects rearwardly from the drawbar 18 to define a downwardly and rearwardly inclined guide ramp 25, opposite side edges of which are first upturned as at 25a and then inturned to define opposed lips 25b which collectively define rearwardly diverging opposed channels 25c.

As shown particularly in FIG. 2, the ramp 25 terminates at its forward end in a horizontally disposed platform portion 26, which forms the forward extension of the ramp 25 in underlying downwardly spaced relationship to the mouth 24 defined by the jaws 22, 23. As shown particularly in FIG. 1, the spacing of the ramp portion 26 from the jaws 22, 23 is such as to cause the hitch portion 15c to be received in the mouth 24 during upward and forward movements of the shoe 16 on the guide ramp 25.

During such movements, as shown particularly in FIGS. 1, 2, and 3, the diametrically enlarged shoe 16 is at least partially received within either of the channels 25c so as to prevent accidental upward displacement thereof prior to and during entry into the jaws 22, 23 during hitching operations.

As shown particularly in FIG. 4, as the pin 15 moves on to the platform 26 from the ramp portion 25 thereof, it enters the mouth 24 of the jaws 22, 23, spreading same apart on pivot axes 22a, 23a whereby to bring same within the recess defined by the opposed notches 27, 28. Further movement of the pin 15 into engagement with the overlapping ears 29, 30 defined by the jaws 22, 23 causes the jaws to pivot about their axes in the opposite direction and to assume the full-line pin encompassing position of FIG. 2. The pin 15 is securely held in this towing position by means of a latch dog 31 fast on the operator-controlled rockshaft 32, which dog is received between the forwardly projecting tongue portions 33, 34 defined respectively by the jaw elements 22, 23.

In order to release the pin 15 from towing engagement within the recess defined by the opposed notches 27, 28, it is but necessary for the operator to manually manipulate the rock-shaft to the dotted-line position of FIG. 5, so as to remove the latch dog 31 from between the tongue portions 33, 34.

It is important to note that the channel-forming lips 25b extend upwardly from the ramp 25 to the platform 26 in an unbroken manner. It will be further noted that farm tractors and vehicles towed thereby normally pass over relatively rough terrain in their off-the-road operations. At such times a great amount of twisting movement occurs between the hitch elements of each, in this case bracket means 11, 17. This causes the enlarged shoe 16 of pin 15 to move transversely of the longitudinal dimension of the drawbar 18, tongue 10, and their respective brackets 11, 17. To prevent damage to the bracket means 11, 17, during such twisting motion, the lips 25b converge rearwardly toward the guide ramp 25, as it 35, and provide, at the forward end portion of the platform 26, clearance to permit the above movements of the shoe 16. In many cases, when it is desired to disconnect the tractor and towed vehicle, same may be resting on uneven ground which results in the shoe 16 being displaced to one side of the platform 26. If such is the case, the pin will be guided toward the reduced forward end of the guide ramp 25 by engagement of the pin portion 15d with the rearwardly converging lips 25b indicated at 35 and associated with platform 26.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:

1. In a hitching mechanism for detachably interconnecting the tongue of a trailing vehicle to the drawbar of a towing vehicle equipped with an automatic hitch element having laterally spaced pivotal jaw members, which cooperate to define a rearwardly diverging mouth:
   (a) bracket means adapted to be secured to the tongue of the trailing vehicle, said means including
      (1) a horizontally disposed plate-like bracket element projecting forwardly therefrom,
      (2) a hitch pin rigidly secured to and carried by said bracket element,
      (3) said pin projecting above said bracket element and there defining a hitch portion adapted to be loosely received between the jaw members to interconnect the towing vehicle and trailing vehicle, and
      (4) said pin projecting below said bracket element and defining a leg which terminates at its lower end in a diametrically enlarged shoe, and
   (b) a downwardly and rearwardly diverging guide ramp disposed downwardly and rearwardly of the hitch element of the towing vehicle,
      (1) said ramp terminating in a rear end portion of a substantially greater transverse dimension than the hitch element and a reduced forward end portion,
      (2) a horizontally disposed platform portion secured to said reduced forward end which forms a forward extension of said ramp in underlying spaced relationship to the mouth defined by the jaws of the hitch element.
      (3) opposite side edges of said ramp and platform portions being formed to define opposed channel-forming lips which receive said enlarged shoe and limit vertical movements of said hitch pin during guiding movements thereof toward locking relationship between said jaws, and
      (4) means extending forwardly from said platform portion and secured to the drawbar of the towing vehicle.

2. The structure defined in claim 1 in which said channel-forming lips associated with said platform portion converge rearwardly toward the channel-forming lips of said guide ramp whereby to permit transverse oscillating movements of said enlarged shoe when said hitch portion is loosely received between the jaw elements of the hitch and guide said hitch pin toward the reduced forward end of said guide ramp during disconnection of said towing vehicle and trailing vehicle.

References Cited

UNITED STATES PATENTS

| | | | |
|---|---|---|---|
| 1,233,849 | 7/1917 | Culhane | 280—509 |
| 2,151,181 | 3/1939 | Appell | 280—509 |
| 2,458,848 | 1/1949 | Goff | 280—508 |
| 2,671,673 | 3/1954 | Benson | 280—477 |
| 2,676,034 | 4/1954 | Tracey | 280—508 |
| 3,123,380 | 3/1964 | Grim et al. | 280—477 |

LEO FRIAGLIA, *Primary Examiner.*